United States Patent [19]

Doi

[11] Patent Number: 4,960,285
[45] Date of Patent: Oct. 2, 1990

[54] JAW ASSEMBLY

[76] Inventor: Katsumi Doi, 10-31, Tamakushimotomachi 1-chome, Higashiosaka-shi, Osaka, Japan

[21] Appl. No.: 410,589

[22] Filed: Sep. 21, 1989

[30] Foreign Application Priority Data

Sep. 22, 1988 [JP] Japan .................................. 63-125244
Jun. 16, 1989 [JP] Japan .................................. 1-71064

[51] Int. Cl.$^5$ ............................................. B23B 31/16
[52] U.S. Cl. ..................................... 279/123; 279/110
[58] Field of Search .......................... 279/110, 123, 121

[56] References Cited

U.S. PATENT DOCUMENTS

| 2,687,308 | 8/1954 | Highberg et al. | 279/123 |
| 2,777,704 | 1/1957 | Sloan | 279/123 |
| 2,869,884 | 1/1959 | Etchell | 279/123 |
| 3,679,221 | 7/1972 | Behrens | 279/123 |
| 4,221,391 | 9/1980 | Dutton | 279/123 |

FOREIGN PATENT DOCUMENTS

| 2839320 | 3/1980 | Fed. Rep. of Germany | 279/123 |
| 89836 | 7/1967 | France | 279/123 |
| 58-10405 | 1/1983 | Japan | 279/123 |

Primary Examiner—Daniel W. Howell
Attorney, Agent, or Firm—Wenderoth, Lind & Ponack

[57] ABSTRACT

A jaw assembly includes a master jaw and a work clamping jaw bolted to the master jaw. The master jaw is formed along its axis with a cylindrical bore and in its top surface with an elongated hole having a width smaller than the diameter of the cylindrical bore and communicating with the cylindrical bore. At least one cylindrical seating nut having a diameter slightly smaller than that of the cylindrical bore is inserted therein. A fixing bolt is put through the work clamping jaw and the elongated hole of the master jaw and screwed into a threaded hole formed in the seating nut. The master jaw and the work clamping jaw can be coupled together in a position relative to each other that is adjustable by tightening the fixing bolt.

2 Claims, 3 Drawing Sheets

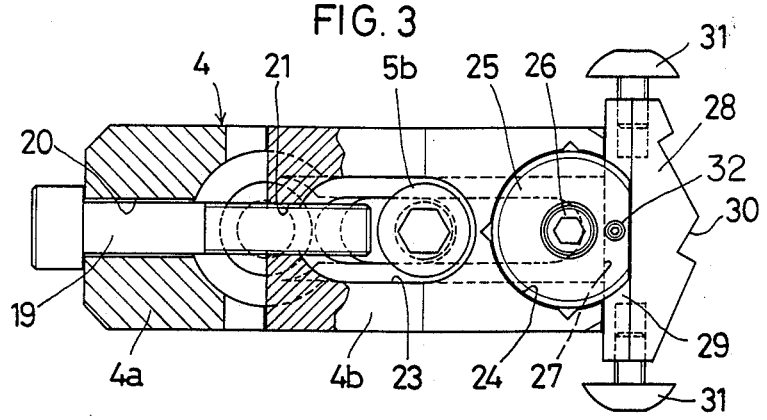
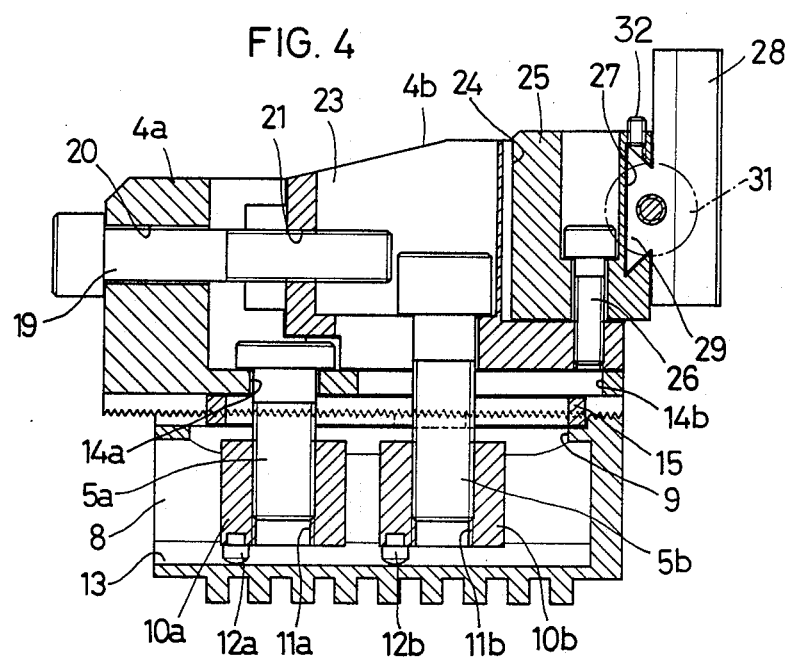

4,960,285

JAW ASSEMBLY

BACKGROUND OF THE INVENTION

The present invention relates to a jaw assembly comprising a master jaw and a work clamping jaw (known as a top jaw or soft jaw) for use with a scroll chuck or the like.

A prior art jaw assembly for use with a scroll chuck comprises a master jaw slidably fitted in a guide groove (such as a T slot) extending radially in a chuck body having its bottom in meshing engagement with a scroll plate, and a work clamping jaw bolted to the master jaw so as to be movable together with the master jaw.

FIG. 7 shows one of such prior art jaw in which the relative position between a work clamping jaw 4 and a master jaw 2 in the axial direction (sliding direction of the jaw) is adjustable so as to expand the range of diameter of a workpiece which the chuck can grip. The master jaw 2 is formed with a T slot 40 extending end to end. A seating nut 3 is slidably fitted in the T slot 40. A bolt 5 is screwed through the work clamping jaw 4 into the seating nut 3. The work clamping jaw 4 is slid axially with respect to the master jaw 2 to a desired position and the bolt 5 is tightened. The jaws 2 and 4 are formed with serrations 6 and 7, respectively, to couple them together in a desired position precisely and stably.

A scroll chuck having such prior art chuck jaws tends to develop looseness between the master jaw and the guide groove formed in the chuck body owing to wear and plastic deformation which progress with use. Once such looseness appears, the master jaw, which lacks rigidity owing to the provision of the T slot, will be more vulnerable to the reaction force when chucking, so that the T slot tends to gape in the transverse direction. This will deteriorate the accuracy and stability in the gripping of the workpiece and thus the machining accuracy. Such a decrease in the machining accuracy is especially remarkable with a chuck for use in deep or high-speed machining.

Further, the T slot 40 as well as the seating nut 3 unrotatably fitted in the T slot have such complicated shapes that the machining is rather difficult. This will lead to an increase in the production cost of each jaw and thus the entire chuck.

SUMMARY OF THE INVENTION

It is an object of the present invention to provide a jaw assembly comprising a master jaw and a work clamping jaw which obviates the abovesaid shortcomings.

In accordance with the present invention, there is provided a jaw assembly comprising a master jaw slidably fitted in a radially extending guide groove formed in a chuck body and a work clamping jaw adapted to be bolted to the master jaw, the master jaw being formed along the axis thereof with a cylindrical bore and in the top surface thereof with an elongated hole having a width smaller than the diameter of the cylindrical bore and communicating with the cylindrical bore, the work clamping jaw being movable axially with respect to the master jaw, a cylindrical seating nut formed with a threaded hole extending perpendicular to the axis of the cylindrical bore, the cylindrical seating nut having a diameter slightly smaller than that of the cylindrical bore so as to be slidably received in the cylindrical bore, and a fixing bolt screwed through the work clamping jaw and through the enlongated hole and into the threaded hole in the cylindrical seating nut so as to be couple the work clamping jaw and the master jaw together in a fixed position with respect to each other.

According to present invention, the T slot formed in the master jaw in the prior art structure is replaced with a combination of the cylindrical bore and the elongated hole, so that portions of the master jaw formed at both sides of the elongated hole are integral with each other through the bridging portions formed at both ends of the elongated hole. This arrangement will serve to protect the jaw from fatigue as well as damage resulting from long use. Further, even if the master jaw should get loose in the guide groove owing to fatigue or damage, the opening formed in the top of the master jaw will be prevented from gaping in spite of the fact that the master jaw is subjected to a rather large reaction force under chucking in such a situation. Thus the jaw can grip the workpiece precisely and stably.

The cylindrical bore and the elongated hole can be formed by an ordinary drill and an end mill having a simple shape, respectively. The seating nuts can be made simply by cutting a cylindrical member to a desired length and forming a threaded hole in each of them.

BRIEF DESCRIPTION OF THE DRAWINGS

Other features and objects of the present invention will become apparent from the following description taken with reference to the accompanying drawings, in which:

FIG. 3 is a partially cutaway plan view of the same in an assembled condition;

FIG. 4 is a side view of the same showing how the master jaw and the work clamping jaw are assembled together.

DETAILED DESCRIPTION OF THE PREFERRED EMBODIMENT

Figure 1:
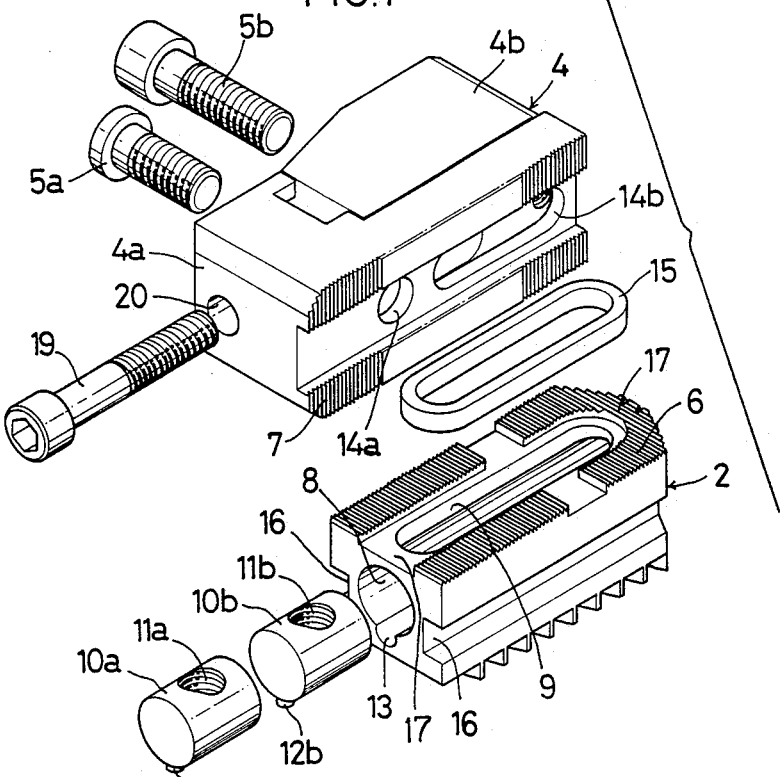
FIG. 1 is an exploded perspective view of the preferred embodiment of a jaw assembly according to the present invention.

FIG. 1 shows the first embodiment of the present invention which comprises a master jaw 2 and a work clamping jaw 4.

The master jaw 2 is formed with an axial cylindrical bore 8 having one end thereof open to the rear end of the master jaw 2 while the other end is closed. It is also formed in its top surface with an elongated hole 9 communicating with the cylindrical bore 8. Seating nuts 10a and 10b are inserted into the bore 8 to receive bolts 5a and 5b, respectively, screwed through the clamping jaw 4 into respective threaded holes 11a and 11b. The seating nuts 10a and 10b have a diameter larger than the width of the elongated hole 9 and slightly smaller than the diameter of the cylindrical bore 8 so as to be longitudinally slidable in the bore 8 but so as not to be removable from the master jaw 2 through the elongated hole 9. The seating nuts 10a and 10b are provided with pins 12a and 12b (which may be replaced with keys), respectively, adapted to be loosely received in an axial key groove 13 open to the bore 8 to prevent the seating nuts 10a and 10b from turning.

The master jaw 2 and the work clamping jaw 4 are formed on their top and bottom surfaces, respectively, with serrations 6 and 7 so that the latter can be mounted stably in a desired position on the former. The work clamping jaw 4 comprises two separate blocks, i.e. a first block 4a and a second block 4b.

A spacer 15 may be put in the upper part of the elongated hole 9 to minimize the size of the gap formed between the jaws 2 and 4 coupled together.

Figure 7:
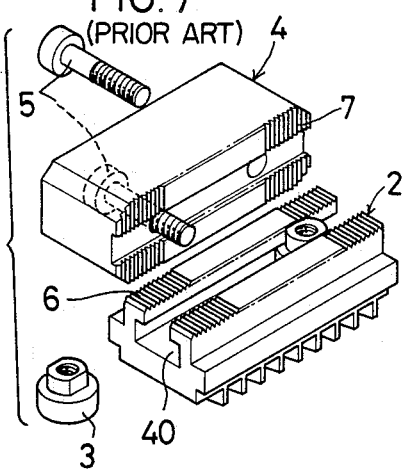
FIG. 7 is a perspective view of a prior art jaw assembly.

The master jaw 2 may be formed with grooves 16 in both side surfaces thereof as shown in FIG. 1. In place of such grooves 16 the master jaw 2 may be formed with ribs (as shown in FIG. 7) adapted to be engaged in grooves formed in a chuck body.

The bolts 5a and 5b screwed into the seating nuts 10a and 10b can be tightened in any desired position within the range allowed by the length of the elongated hole 9, so that the work clamping jaw 4 can be fixed in a desired positon relative to the master jaw 2.

Further, the master jaw 2 is formed at both ends of the elongated hole 9 with bridge portions 17 so as to connect both side portions thereof together and thus increase the overall rigidity thereof.

The blocks 4a and 4b can be fixed in a desired position with respect to the master jaw 2 separately from each other. The fixing bolt 5a for tightening the first block 4a should screwed deep into a bolt hole 14a so as not to protrude from the bolt hole. The fixing bolt 5b is put through an elongated hole 23 formed in the second block 4b and an elongated hole 14b formed in the first block 4a and is then screwed into the bolt hole 11b in the seating nut 10b. The bolt hole 23 in the second block 4b and the bolt hole 14b in the first block 4a are both elongated to facilitate the adjustment of the position of the blocks 4a and 4b. A bolt 19 is screwed through a seat hole 20 formed in the first block 4a and into a threaded hole 21 formed in the second block 4b to adjust the amount of the overlap between the blocks 4a and 4b.

Figure 2:
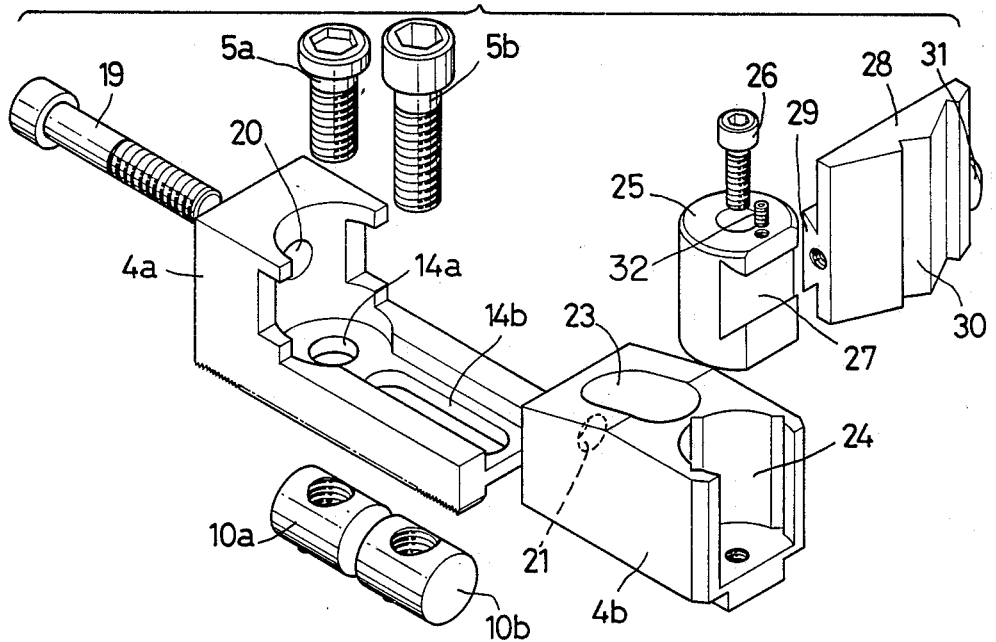
FIG. 2 is a similar view of the work clamping jaw and related parts of the jaw assembly of FIG. 1.

As shown in FIG. 2, the second block 4b is formed with a partially cut off cylindrical recess 24 to receive a cylindrical block 25 which is fixed to the second block 4b by tightening a fixing bolt 26.

The cylindrical block 25 is formed in its peripheral surface at its front side with a dovetail groove 27. A slide block 28 is formed on its rear side with a key 29 adapted to be slidably fitted in the dovetail groove 27 of the block 25. The slide block 28 is formed with a work clamping surface 30 on its front side.

A conventional exchangeable jaw assembly of this type is mountable on the scroll body so that its work clamping surface is immovable relative to the body. Thus it is practically impossible to clamp a workpiece having a square section with a scroll chuck having three such conventional jaws.

Figure 6:
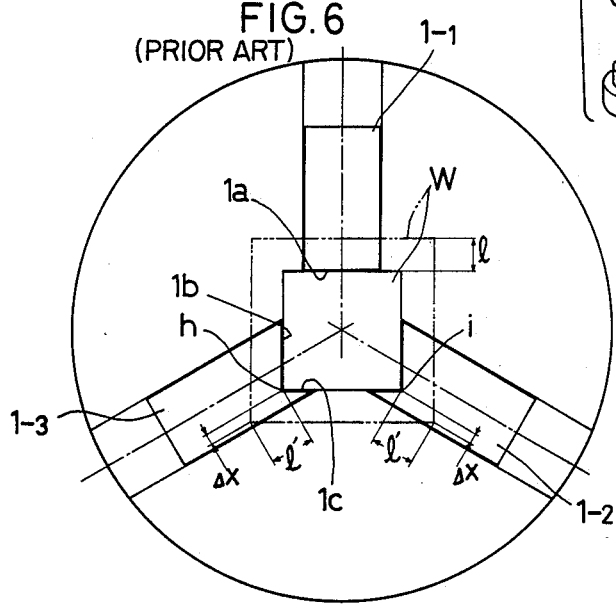
FIG. 6 is a schematic plan view of the same illustrating the clamping operation.

More specifically, suppose that jaws 1-1 to 1-3 shown in FIG. 6 have such work clamping surfaces that the jaw 1-1 and the other jaws 1-2 and 1-3 can be brought into close contact with a workpiece W having a square section at its one side and two corners, respectively. These jaws cannot clamp a square workpiece of a different size. For example, in order to bring the respective work clamping surfaces into close contact with a workpiece W delineated by the chain lines, the jaw 1-1 has to be moved radially outwardly by a length l from the position for gripping the workpiece W delineated by the solid lines, whereas the jaws 1-2 and 1-3 have to be moved by a length l' ($>$l). Since the jaws cannot be moved different distances from one another, it is impossible to bring all the work clamping surfaces into close contact with the large workpiece W.

Moreover, the jaws 1-2 and 1-3 capable of clamping the workpiece W cannot clamp a workpiece having the corresponding shape but larger because with such a large workpiece, its corners corresponding to the corners h and i of the workpiece W are offset from the track of the work clamping surfaces of the jaws 1-2 and 1-3.

The jaw according to the present invention is used as a substitute for the jaws 1-2 and 1-3 shown in FIG. 6. The bolt 5a is screwed into the threaded hole 11a in the bottom-closed nut 10a to fix the first block 4a to the master jaw 2, whereas the bolt 5b is screwed into the nut 10b to fix the second block 4b to the master jaw 2. The slide block 28 is slid laterally to bring its work clamping surface 30 to a required position. One of a pair of bolts 31 is screwed into the side of the slide block 28 until its head abuts the side of the second block 4b. Finally a screw 32 is tightened to fix the slide block 28 in position. (FIG. 2)

Figure 5:
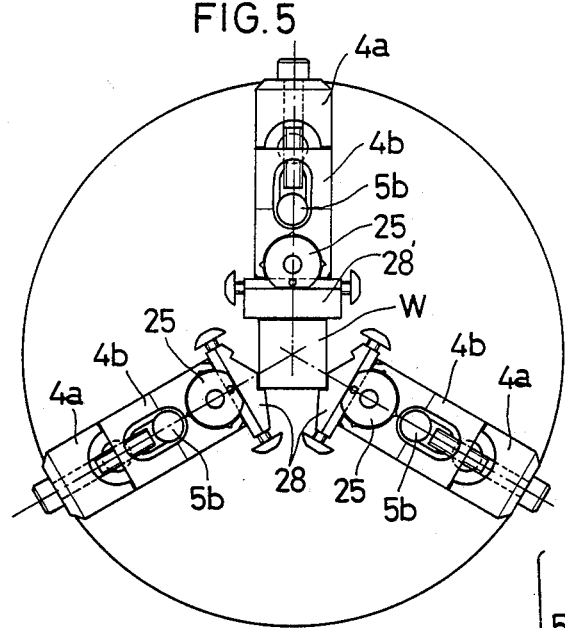
FIG. 5 is a plan view of a plurality of jaw assemblies of the present invention clamping a workpiece having a square section.

The jaw shown in at the top of FIG. 5 is used as a substitute for the jaw 1-1 shown in FIG. 6. It includes a slide block 28' having a flat work clamping surface. To clamp the workpiece W, the bolt 5a is tightened beforehand to fix the first block 4a to the master jaw 2, whereas the bolt 5b is kept loose so that the second block 4b is axially slidable. After adjusting the position of the work clamping surfaces of the other two jaws, the second block 4b is moved together with the slide block 28 toward the center of the workpiece until its work clamping surface 30 comes into contact with the workpiece. The bolt 5b is then tightened. Now that the work clamping surfaces of the three jaws are in close contact with the workpiece, the three, jaws are tightened against the workpiece so that the workpiece is stably and rigidly held in position.

It would be sufficient if the slide block 28 were formed on the front side thereof with two work clamping areas 30. (FIG. 2) But it may be formed with more than two work clamping areas located at distances from the center of the slide block 28 that differ from one another. This will serve to expand the adjustable positioning range and increase the clamping stability.

In order to clamp a workpiece having a different shape, it is necessary to exchange the slide block 28 with a new one having a work clamping surface of a different shape. But considering the fact that it was necessary to exchange the whole jaw in the prior art structure, the arrangement according to the present invention is not only economically advantageous but also reduces labor associated with the exchange.

Since the second block 4b is slidable relative to the first block 4a in the direction of movement of the master jaw 2, the difference between the lengths l and l' illustrated in FIG. 6 can be compensated for by adjusting the relative position of the second block. For example, in order to clamp the workpiece designated by chain lines in FIG. 6 with the jaws 1-1 to 1-3 according to the present invention, they are moved radially outwardly by the length l' from the position shown by solid lines and then the second block of the jaw 1-1 is moved radially inwardly by a length l'—l so that the work clamping surface 1a will come, into close contact with the one side of the workpiece.

As the jaws 1-2 and 1-3 are moved radially outwardly by the length l, their respective work clamping surfaces 1b and 1c will move in parallel with the jaws along the paths indicated by chain lines by the length l'. In this state, the corners of the work clamping surfaces 1b and 1c are located on the respective chains lines. In other words, they are offset from the respective corners h and i of the workpiece by a distance Δx in a lateral direction. Thus by moving the slide blocks of the respective jaws 1-2 and 1-3 by the distance ΔX, the work clamping surfaces 1b, and 1c can be brought into close contact with the workpiece.

When chucking a workpiece having a square cross section, the jaws 1-2 and 1-3 should preferably be moved to a position to support the workpiece at two points h and i before moving the jaw 1-1 to a position to support the work at one side thereof.

A work clamping surface may be formed on the front side of the block 25 instead of forming the dovetail 27 so as to clamp a workpiece in the same manner as with a prior art chuck jaw.

What is claimed is:

1. A jaw assembly comprising:
   a master jaw having a longitudinal axis, and top and bottom surfaces, and defining a cylindrical bore extending longitudinally therein between said top and bottom surfaces, and an elongate hole extending longitudinally of said master jaw and open at said top surface thereof, the elongate hole spaced from the outer periphery of said top surface such that said top surface has side portions extending respectively, along sides of said elongate hole and bridging portions extending between said side portions, respectively, at ends of said elongate hole, the elongate hole having a smaller width as taken between said side portions than the diameter of said cylindrical bore, and the elongate hole open to said cylindrical bore;
   a work clamping jaw adjustably fitted to said master jaw so as to be fixable to said master jaw in a plurality of positions spaced along said longitudinal axis; and
   a cylindrical seating nut and a fixing bolt fixing said work clamping jaw to said master jaw,
   said cylindrical seating nut having a diameter slightly small than that of said cylindrical bore and disposed therein, and said cylindrical seating nut defining a threaded hole therein extending perpendicular to the longitudinal axis of said cylindrical bore, and
   said fixing bolt extending through said elongate hole, threaded to said seating nut and clamping said work clamping jaw to said master jaw to couple the work clamping jaw and the master jaw together in a fixed position with respect to each other.

2. A jaw assembly as claimed in claim 1, wherein said work clamping jaw comprises a plurality of separate blocks.

* * * * *